Figure 1:
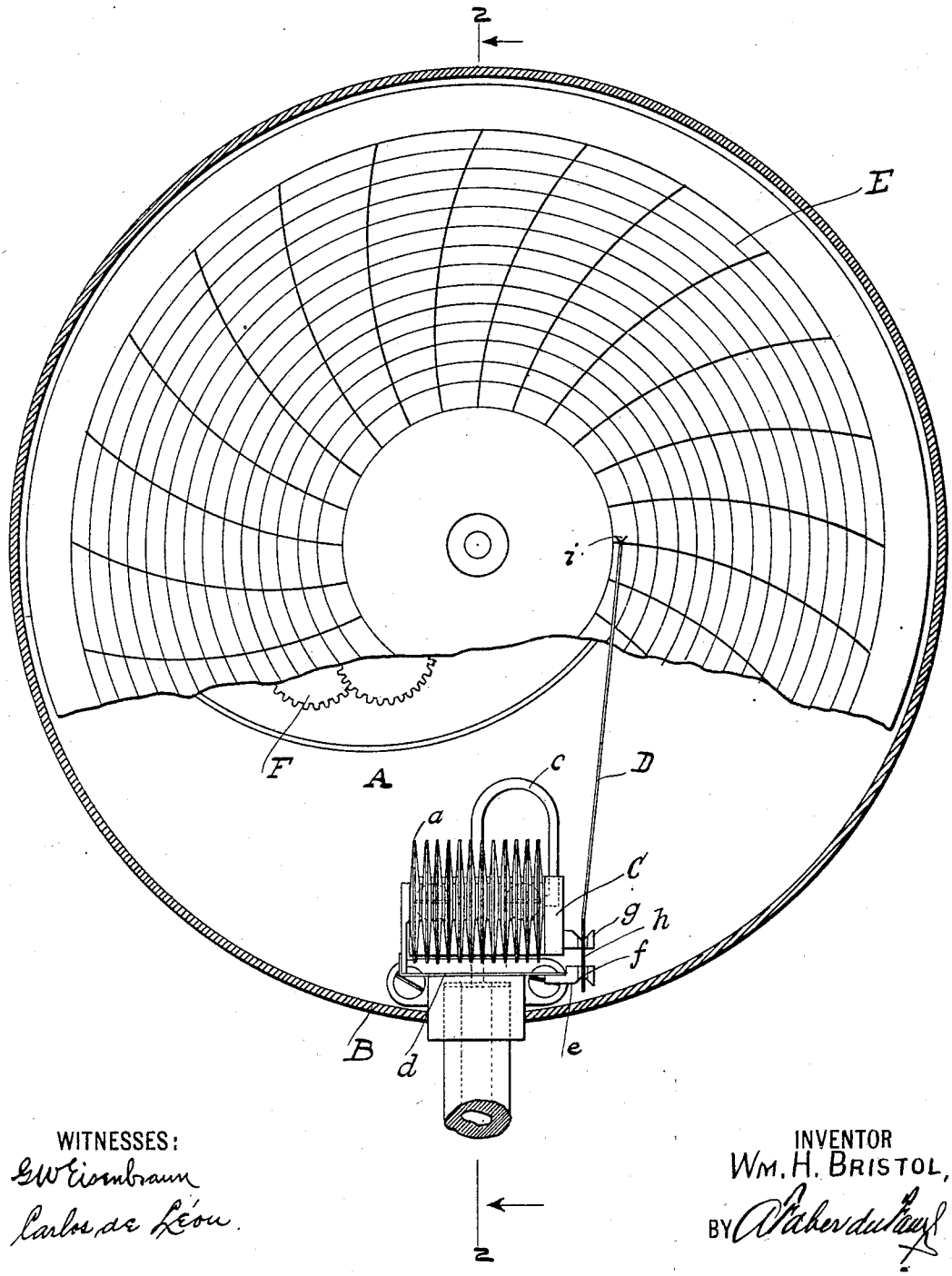

No. 625,537. Patented May 23, 1899.
W. H. BRISTOL.
MULTIPLYING DEVICE FOR RECORDING INSTRUMENTS.
(Application filed Aug. 11, 1898.)
(No Model.) 3 Sheets—Sheet I.

WITNESSES:
INVENTOR
Wm. H. Bristol,
BY
ATTORNEY

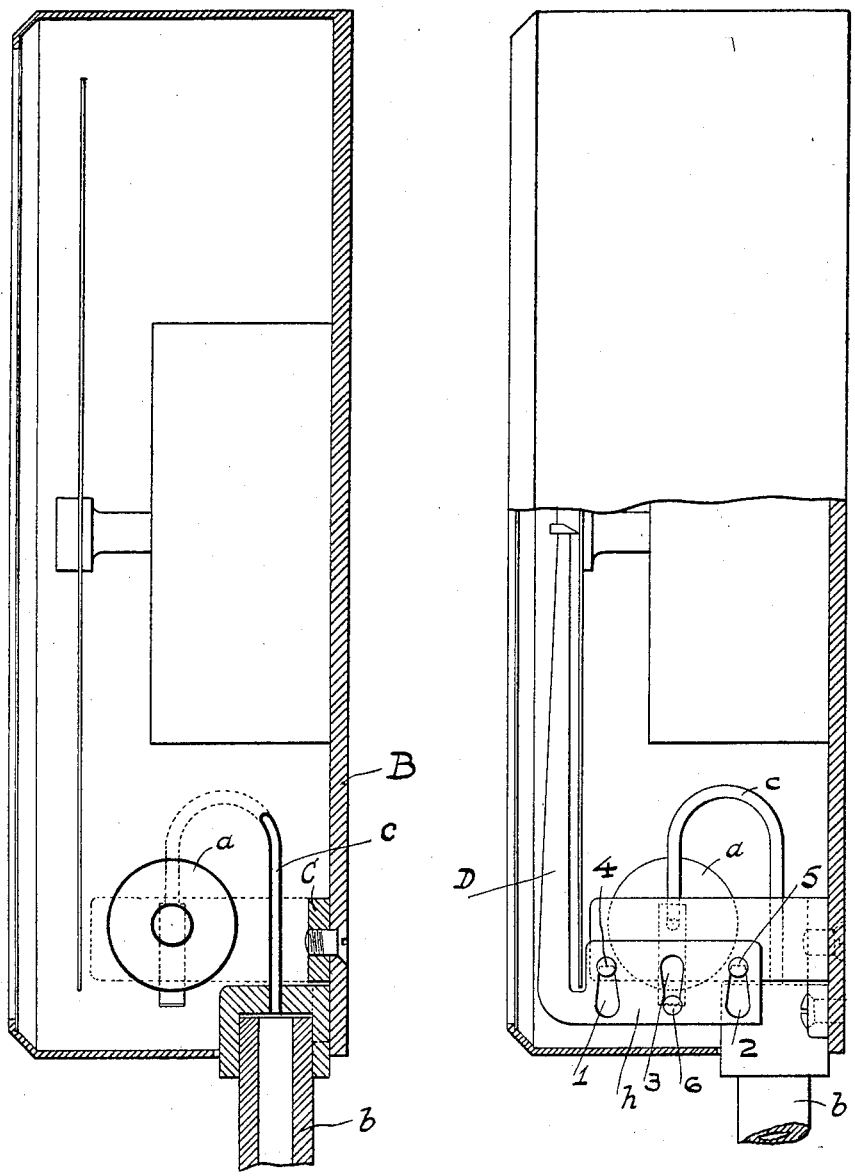

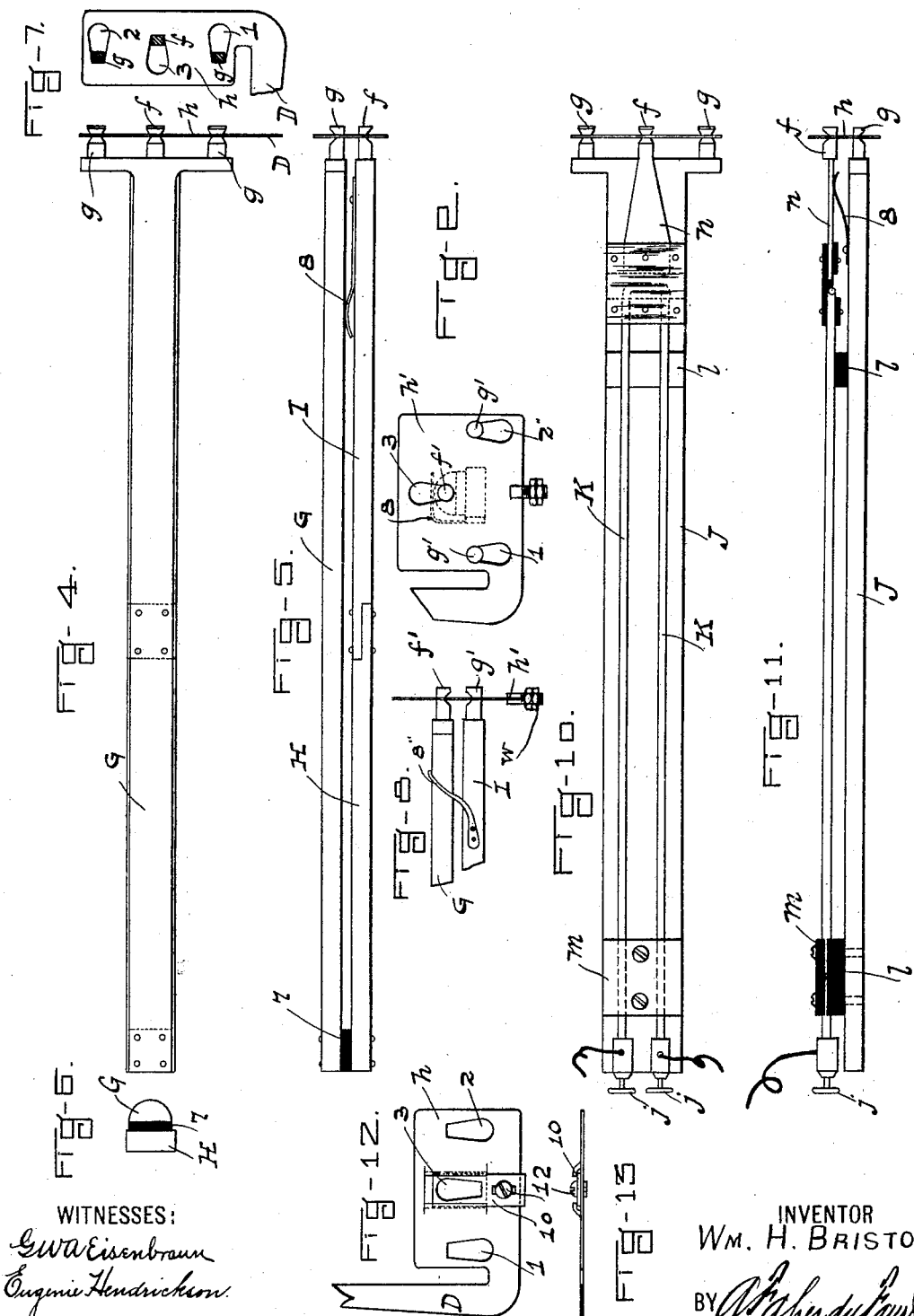

UNITED STATES PATENT OFFICE.

WILLIAM H. BRISTOL, OF HOBOKEN, NEW JERSEY.

MULTIPLYING DEVICE FOR RECORDING INSTRUMENTS.

SPECIFICATION forming part of Letters Patent No. 625,537, dated May 23, 1899.

Application filed August 11, 1898. Serial No. 688,354. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Multiplying Devices for Recording or Indicating Instruments, of which the following is a specification.

My invention has reference to improvements in devices for multiplying motion in indicating or recording instruments of any description—such as pressure indicating or recording gages, thermometers, barometers, pyrometers, electric measuring apparatus, &c.—it having for its objects to reduce the cost of production and to provide means by which any ordinary device expansible or movable under the influence of pressure, temperature, and the electric current may be caused to produce a record or indication without expensive and unreliable multiplying devices. In the prior patents to me, No. 505,243, dated September 19, 1893, and No. 514,257, dated February 6, 1894, and in the patent to me and Edgar H. Bristol, No. 514,256, dated February 6, 1894, devices are shown by which multiplication of the motion of the recording device is produced by the inherent construction of the device affected by pressure or the electric current; but the object of my present invention, as before stated, is to produce such multiplication with an ordinary expansible and contractible or movable device in the most simple and least expensive manner possible and with practically no friction.

The nature of my invention will best be understood when described in connection with the accompanying drawings, in which—

Figure 1 represents a sectional elevation of a recording pressure-gage embodying my invention, part of the chart being broken away. Fig. 2 is a vertical section on the line 2 2, Fig. 1. Fig. 3 is a sectional end elevation taken from the right-hand side of Fig. 1. Fig. 4 is an elevation of a pyrometer embodying my improved multiplying device. Fig. 5 is a plan or top view of the same. Fig. 6 is an end view from the left-hand side of Fig. 4. Fig. 7 is an end view from the right-hand side of Fig. 4, said figure being partly in section. Figs. 8 and 9 represent side and end elevations of a modified form of the construction shown in Fig. 4. Fig. 10 is a plan or top view of my invention as applied to an electric measuring device. Fig. 11 is a side elevation of the same. Fig. 12 is an end elevation of an indicating or recording arm and plate provided with means for adjusting one of the knife-edges. Fig. 13 is an end view of Fig. 12.

Similar letters and numerals of reference designate corresponding parts throughout the several views of the drawings.

Referring at present to Figs. 1, 2, and 3 of the drawings, in which I have shown my invention applied as a means of multiplication to a recording pressure-gage of a construction substantially illustrated in the patents previously referred to, the letter A designates an expansible and contractible device made of a series of connected expansible sections *a*, each formed of two diaphragms placed opposite and having concentric openings, the whole forming a tube adapted to contract and expand under varying pressures of steam, liquids, or gases. The fluid is conducted to said tube A through a pipe *b*, attached in the usual manner to the casing B of the indicating or recording device, which said pipe *b* communicates with a tube *c*, entering the expansible and contractible device A, preferably at the stationary end. One end of said expansible and contractible device is attached by soldering or otherwise to a bracket C, which is secured to the casing B in any suitable manner. To the opposite or free end of the expansible and contractible device is secured a rod *d*, made of flexible material and provided at its end with a knife-edge bearing or support *f*. Said rod could be made heavy and hinged; but for practical purposes I prefer to make the same of thin resilient material in the form of a flat band, the knife-edge bearing or support *f* being made heavier and secured thereto either by riveting or brazing. To the bracket C, forming the support for the expansible and contractible device A, are attached two knife-edge bearings or supports *g*, located substantially equidistant with respect to the knife-edge bearing or support *f*, carried by the rod *d*, and having their faces directed opposite to the face of the knife-edge bearing or support $f$. Of course it is to be understood that one knife-edge bearing or support $g$, attached to the bracket or other stationary portion of the recording instrument, would suffice; but to prevent torsional or twisting strains I prefer to use two such knife-edge bearings or supports, located as described. It is now evident that expansion or contraction on the part of the device A will produce motion of the knife-edge bearing or support $f$ relative to the knife-edge bearings or supports $g$ in view of rod $d$, which connects it with said device, and that consequently an arm suitably mounted on said knife-edge bearings or supports $g$ will have imparted thereto an angular or vibratory motion. In the present example I have shown a recording-arm D, provided at its lower portion with a plate $h$, having slots 1, 2, and 3, said slots being provided at one end with knife-edges 4, 5, and 6, which are engaged by the knife-edge bearings or supports $f$ and $g$, while the opposite ends of said slots are of such dimensions as to permit the plate $h$ to be readily slipped over the knife-edge bearings or supports $f$ and $g$ to its proper operative position. The rod $d$, as before stated, is made flexible and has a tendency to separate the knife-edge bearing or support $f$ from the knife-edge bearings or supports $g$, and consequently keeps the knife-edges in contact with said bearings or supports. In the construction described it will be seen that the upper knife-edge bearings or supports $g$—that is, the stationary knife-edges—constitute a fulcrum about which the arm D, with its attached plate $h$, turns, while the power is applied through the knife-edge bearing or support $f$, located below the knife-edge bearings or supports $g$, and consequently the marking device—that is, the style or pencil $i$, which is located at the end of the arm D—receives a large motion in an arc when the knife-edge bearing or support $f$ is moved linearly by the expansion or contraction of the device A in view of the ratio between the distances $f\,g$ and $g\,i$. In the present example I have shown a recording-chart E, provided with suitable divisions for time and pressure and actuated by a clock-movement F in the usual manner. The mechanism for operating the chart and the means for attaching the same are old and well-known and need not be more fully described here.

In Figs. 4 to 7 I have shown my invention applied to a pyrometer, in which G designates a unitary bar, to which is attached at one end a composite bar H I, composed in its member I of material the same as the bar G, while its member H is composed of material having a coefficient of expansion either greater or less than the coefficient of expansion of the bar G, the said two bars G and H I being held at a distance apart by a block 7 at one end—that is, the end intended to be introduced into the furnace—and at their other end by a spring 8, interposed between the two bars and attached to one of the same. At their free or outer ends the bars are provided with knife-edge bearings or supports $g$ and $f$, as before described, to which is fitted the plate $h$, carrying the indicating or recording arm D. In view of the difference of expansion between the unitary bar G and the composite bar H I angular movement is imparted to the plate $h$ and to the recording-arm D, as before described in connection with Figs. 1, 2, and 3, producing correspondingly large deflections of the style or pencil $i$.

While I have shown the spring 8 in Figs. 4, 5, and 7 to have for its function the spreading apart of the members for the purpose of keeping the knife-edge bearings or supports against the knife-edges of the slots in the plates $h$, it is evident that this construction could be reversed—that is to say, the function of the spring 8, as shown in Figs. 8 and 9, could be to press the members toward each other. In this instance and as shown in Figs. 8 and 9 the knife-edge bearings or supports $f'$ and $g'$ on the members face each other instead of being opposed to each other and the slots 1, 2, and 3 are farther separated.

In order to provide for adjustment, one of the slots—say, for instance, 3—may be formed in a slide 10, which is adjustable linearly with respect to the slots 1 and 2, as shown in Figs. 12 and 13. The slide 11 may have a usual screw-and-slot connection 12 with the plate $h$, so that it can be adjusted to the desired position, thereby either increasing or decreasing the leverage, and consequently the motion, of the end of the recording or indicating arm.

In a manner similar to that heretofore described in connection with the pyrometer or temperature-measuring device the multiplying mechanism may be applied for the purpose of indicating changes in an electric current—that is, for instance, to ampere-meters, voltmeters, galvanometers, &c. This construction I have illustrated in Figs. 10 and 11, in which figures J designates a bar having at its end two knife-edge bearings or supports $g$. Over said bar is conducted a return-wire K, provided at opposite ends with suitable binding-posts $j$ for the attachment of the wires for the current to be measured. Said return-wire K is insulated from the bar J by suitable blocks $l$ of insulating material and rigidly secured by caps $m$ of non-conducting material. The return-wire K may be covered with insulating material, but preferably it should be a bare wire, so that the circulation of air about the same may permit quick radiation. The free end or bend of the return-wire K has an insulated connection with a rod or plate $n$, moving a knife-edge bearing or support $f$ and subjected to the pressure of a spring 8, which holds the knife-edges against the bearings or supports, as previously described in connection with Figs. 4, 5, 8, and 9.

It will be readily understood that the linear expansion caused by increase and decrease of temperature due to the passage of a current through the return-wire K will produce motion of the knife-edge bearing or support $f$ relative to the knife-edge bearings or supports $g$, thereby turning the plate $h$, to which the indicating or recording arm D is connected, as previously described with reference to the preceding figures.

To balance the weight of the arm D, carrying the pen or other marking device $i$, a suitable counterweight $w$ may be attached to the lower end of the plate $h$ or $h'$, as shown in Figs. 8 and 9, which said counterweight consists of a nut screwed upon a threaded shank attached to the plate and a lock-nut adapted to hold the first nut in its adjusted position, or the plate may be loaded or made in such form as to balance the weight of the recording or indicating arm.

What I claim as new is—

1. In a recording or indicating instrument, the combination of two relatively-movable members each provided with a V-groove, the sides of the groove of one member diverging in a direction directly opposed to those of the groove of the other member and the meeting-line of the sides of one groove being parallel to that of the other and at right angles to the direction of the relative movement of the members, a thin plate provided with a recording or indicating arm rigidly secured thereto and having oppositely-faced, parallel bearing edges formed therein and fitted to the V-grooves in the two members respectively and also lateral bearing edges touching the sides of said members at the extremities of said meeting-lines only, and means for moving one or both of said members, whereby said plate is turned by the relative movement of said members and the recording or indicating arm is correspondingly moved, substantially as described.

2. In a recording or indicating instrument, the combination of an expansible and contractible or movable device, influenced by changes, of a stationary member; a movable member; each of said members being provided with a V-groove, the sides of the groove of one member diverging in a direction directly opposed to those of the groove of the other member and the meeting-line of the sides of one groove being parallel to that of the other and at right angles to the direction of the relative movement of the members, and a thin plate provided with a recording or indicating arm rigidly secured thereto and having oppositely-faced, parallel bearing edges formed therein and fitted to the V-grooves in the two members respectively and also lateral bearing edges touching the sides of said members at the extremities of said meeting-lines only, whereby said plate is turned by the relative movement of said members and the recording or indicating arm is correspondingly moved, substantially as described.

3. In a recording or indicating instrument, the combination of two relatively-movable members, one of which is provided with two V-grooves arranged in line with each other and the other with a single V-groove, the sides of the grooves of the one member diverging in a direction directly opposed to those of the groove of the other member and the meeting-line of the sides of the grooves in the one member being parallel to the meeting-line of the sides of the groove in the other member and at right angles to the direction of the relative movement of the members, a thin plate provided with a recording or indicating arm rigidly secured thereto and having oppositely-faced, parallel bearing edges formed therein and fitted to the V-grooves in the two members respectively and also lateral bearing edges touching the sides of said members at the extremities of said meeting-lines only, and means for moving one or both of said members, whereby said plate is turned by the relative movement of said members and the recording or indicating arm is correspondingly moved, substantially as described.

4. In a recording or indicating instrument, the combination of two relatively-movable members, each provided with a V-groove, the sides of the groove of one member diverging in a direction directly opposed to those of the groove of the other member and the meeting-line of the sides of one groove being parallel to that of the other and at right angles to the direction of the relative movement of the members, a thin plate provided with a recording or indicating arm rigidly secured thereto and having oppositely-faced, parallel bearing edges formed therein and fitted to the V-grooves in the two members respectively and also lateral bearing edges touching the sides of said members at the extremities of said meeting-lines only, means for moving one or both of said members, whereby said plate is turned by the relative movement of said members and the recording or indicating arm is correspondingly moved, and a counterweight in connection with said plate for balancing the weight of the recording or indicating arm, substantially as described.

5. In a recording or indicating instrument, the combination of two relatively-movable members, each provided with a V-groove, the sides of the groove of one member diverging in a direction directly opposed to those of the groove of the other member and the meeting-line of the sides of one groove being parallel to that of the other and at right angles to the direction of the relative movement of the members, a thin plate provided with a recording or indicating arm rigidly secured thereto and with oppositely-faced, adjustable parallel bearing edges, which said edges are fitted to the V-grooves in the two members respectively and also lateral bearing edges touching the sides of said members at the extremities of said meeting-lines only, and means for moving one or both of said members, whereby said plate is turned by the relative movement of said members and the recording or indicating arm is correspondingly moved, substantially as described.

In testimony whereof I have hereunto set my hand in the presence of two subscribing witnesses.

WILLIAM H. BRISTOL.

Witnesses:
 EUGENIE P. HENDRICKSON,
 GEO. W. EISENBRAUN.